Patented Dec. 25, 1923.

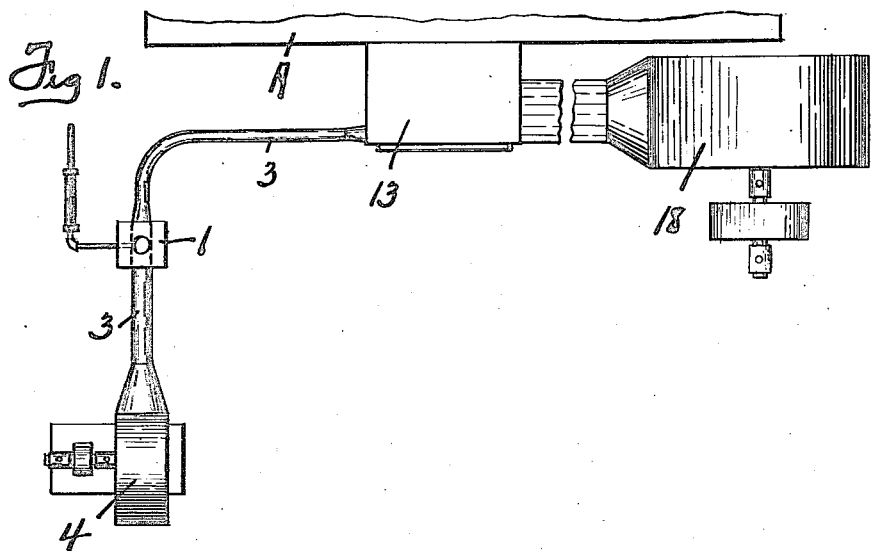
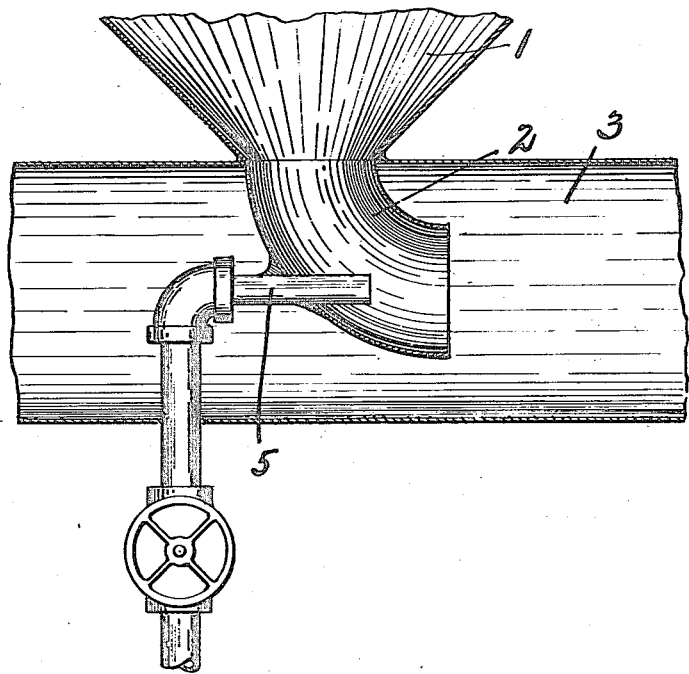

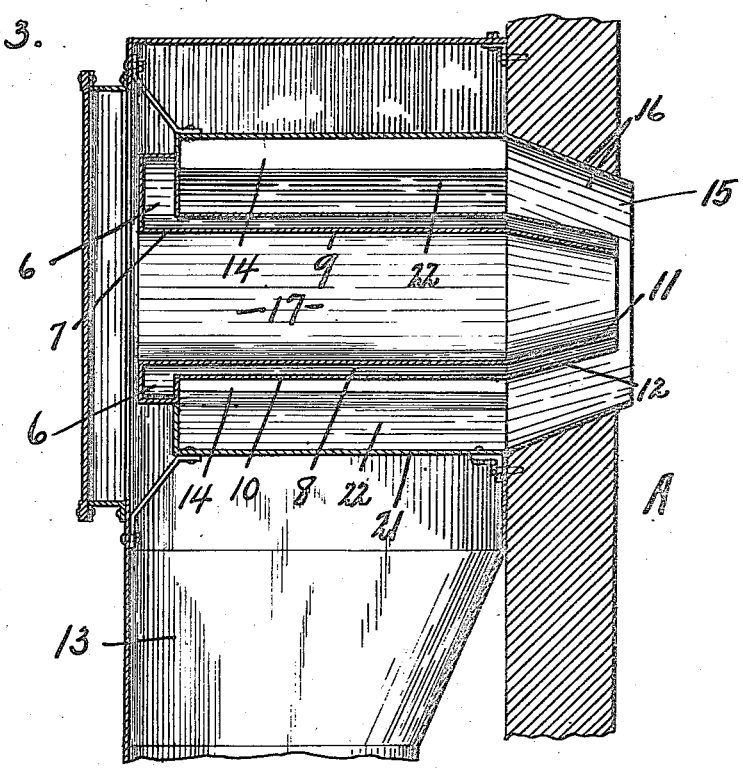
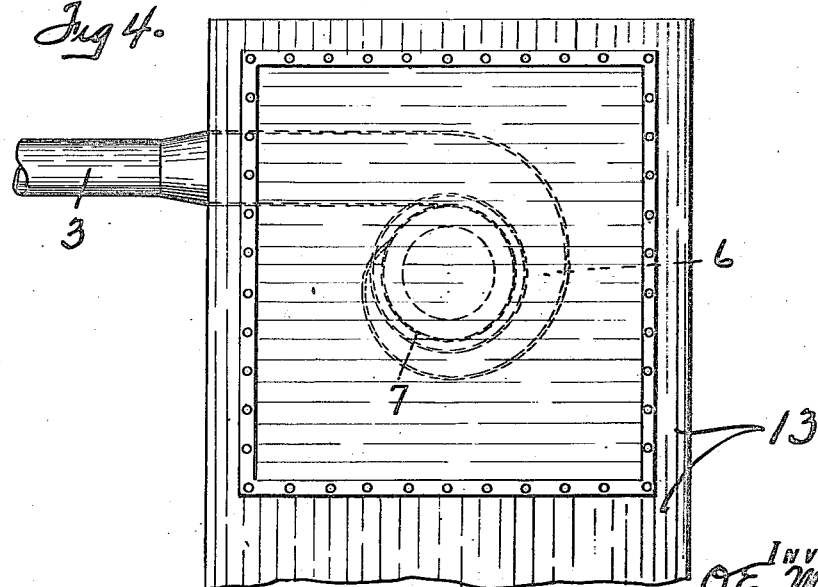

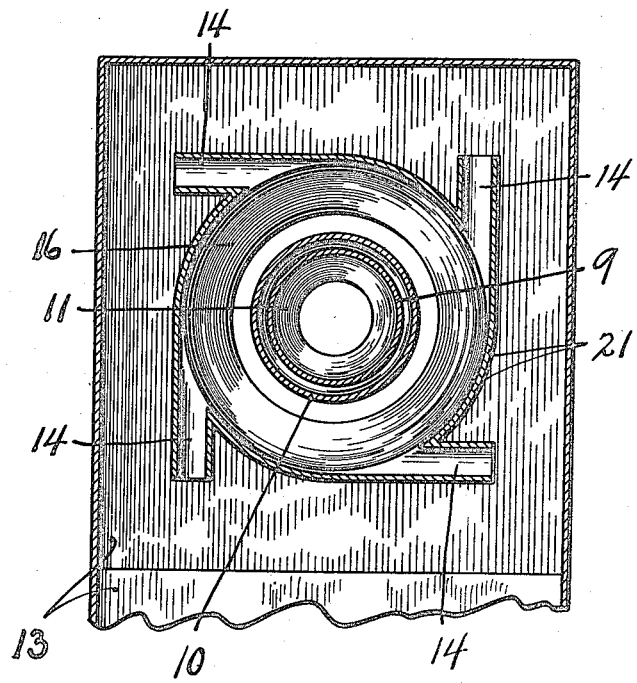

1,478,526

UNITED STATES PATENT OFFICE.

OLIVER EDWARD MERRELL, OF SYRACUSE, NEW YORK, ASSIGNOR TO MERRELL-SOULE COMPANY, OF SYRACUSE, NEW YORK, A CORPORATION OF NEW YORK.

PROCESS AND APPARATUS FOR REMOVING A VAPORIZABLE SUBSTANCE FROM POWDERED MATERIAL.

Application filed November 24, 1920. Serial No. 426,167.

*To all whom it may concern:*

Be it known that I, OLIVER EDWARD MERRELL, of Syracuse, in the county of Onondaga, in the State of New York, have invented new and useful Improvements in Processes and Apparatus for Removing a Vaporizable Substance from Powdered Material, of which the following, taken in connection with the accompanying drawings, is a full, clear, and exact description.

This invention relates to a new and improved process and apparatus for removing a vaporizable substance from powdered material.

The invention has many adaptations and uses, but is designed particularly and is peculiarly adapted for removing moisture from powdered materials, particularly materials to be used for food such as milk powder, which substances are readily sensitive to taint and change, as a result of various conditions, such as too high temperatures for considerable periods of time, stationery contact with highly heated surfaces, etc.

In connection with powdered milk and similar materials it is desirable to reduce the moisture content to a minimum as the keeping qualities of the product depend to a considerable extent upon the moisture content. Very often in the initial practice of desiccation by the spraying process or other processes, the moisture content is not reduced to the desired extent, and in such cases it is desirable to remove additional water from the product.

Further, milk powder as well as many other powders, is of a more or less hygroscopic nature, and during transportation, storage, etc. may absorb moisture from the atmosphere or become dampened in other ways, rendering subsequent drying desirable and the apparatus and process here described is efficient for that purpose.

Other objects and advantages relate to the details of construction of the apparatus and the details of operation of the process, as will more fully appear from the following description taken in connection with the accompanying drawings, in which:

Figure 1 is a top plan view of an apparatus of my invention, capable of being used to carry out the process herein.

Figure 2 is a sectional view of the hopper for containing and the pipe for conveying the powder.

Figure 3 is a sectional view of the air and powder discharging apparatus.

Figure 4 is a vertical rear elevation of Fig. 3.

Figure 5 is a vertical section through the middle of Figure 3.

As shown, the apparatus consists of a hopper —1— for containing the powder to be dried. This hopper has an elbow-shaped nozzle —2— projecting into a pipe —3— which pipe is in communication at one end with a fan or blower —4— adapted to project a current of air under pressure through the pipe —3—, and as the nozzle —2— opens in the direction of flow of air through the pipe —3—, the traveling air will withdraw and pick up the powder discharged from nozzle —2— and convey it to the portions of the apparatus hereinafter described.

Preferably, in order to prevent back pressure in the nozzle —2— and hopper —1—, a comparatively small current of air is discharged through pipe —5— into the nozzle —2— in a direction to project the powder therefrom into the pipe —3—. This air line —5— may contain a suitable separator of any character to prevent oil, etc. from being ejected into the powder.

The pipe —3— has a tangential communication with a distributing chamber —6—, the inner wall —7— of which chamber may be of substantially circular form, while the outer wall is of convolute form so that as the commingled powder and air circle around the annular distributing chamber —6— its gradually tapering form causes the powder and air under uniform pressure and rapid rotary motion to be projected into the annular chamber —8— between the concentric drums —9— and —10—. Preferably these drums —9— and —10— at their forward ends —11— and —12— are tapered inwardly so that the velocity of the commingled air and powder increases as the latter approaches the outlet from the chamber —8—.

Preferably, an additional concentric drum —21— is provided surrounding the drum —10— and forming a whirling air chamber —22— in communication with the wind trunk —13— through a series of openings —14— disposed tangentially to the drum so that the air under pressure passing through wind trunk —13— enters the chamber —12— through the tangential openings —14— and moves with a rapid whirling motion endwise toward the outlet —15— from the chamber —12—. Preferably, the forward end —16— of drum —11— is tapered so that the velocity of the air surrounding the incoming commingled powder and air increases as it approaches the discharge end —15—. The interior of the drum —10— is also in communication with the wind trunk —13—, the rear end of said drum opening into the wind trunk so that a direct current of air blows through the drum —10—.

The result of this is that the hollow stream of commingled powder and air projected from chamber —8— is subjected to an internal direct current of air passing through the chamber —17— and an external whirling current of air passing through the chamber —12—.

The result of this construction and method of operation is that the powder is minutely sub-divided and in this form is subjected for a considerable period of time to the air, which is preferably heated, the whirling motion of the surrounding air tending to shorten the distance of longitudinal travel of the powder, while causing the powder to remain in suspension in the air for a considerable period of time, whereby the drying is rendered most efficient.

The wind trunk —13— is connected to any source of air under pressure, and preferably heated air, and for this purpose it may be connected in the usual manner to a fan or blower —18— to which heated air is supplied in any suitable or well known manner, or the wind trunk —13— may contain heating elements of well known and usual construction for the purpose of heating the air.

The powder and air discharged into the desiccating chamber —A— may be separated in any suitable manner, and preferably in the usual manner the air and vapor are allowed to escape from the chamber separately with the powder through any suitable collecting or screening device, all of which are well known and commonly used in the manufacture of milk powder by the spraying process.

Although I have shown and described a specific construction of apparatus and in connection with the same have outlined a particular process to be carried out by the same, I do not desire to limit myself to the details of the apparatus and process described, as various changes may be made in both the process and apparatus without departing from the invention as set forth in the appended claims.

What I claim is:

1. The method of removing a vaporizable substance from powdered material comprising projecting the powdered material in the form of a hollow stream and introducing a current of moisture-absorbing air within the hollow stream.

2. The method of removing a vaporizable substance from powdered material comprising projecting the powdered material in the form of a hollow stream and enveloping the hollow stream with a current of moisture-absorbing air.

3. The method of removing a vaporizable substance from powdered material comprising projecting the powdered material in the form of a hollow stream, and enveloping the hollow stream with a current of whirling air.

4. The method of removing a vaporizable substance from powdered material, comprising projecting the powder in the form of a hollow stream, introducing a current of air within the hollow sheet and enveloping the hollow stream within an additional current of air.

5. The method of removing a vaporizable substance from powdered material, comprising projecting the powdered material in the form of a hollow stream having a spirally forward motion, and subjecting such stream to the action of a current of air.

6. The method of removing a vaporizable substance from powdered material, comprising projecting such powder in a tubular form, the particles of the powder having a spirally forward motion introducing a current of air within the tube of powder, and enveloping the tube with an additional current of air.

7. In an apparatus of the class described, a distributing chamber having a substantially convolute wall and an annular passage in communication with said distributing chamber.

8. In an apparatus of the class described, a distributing chamber having a substantially convolute wall, an annular passage in communication with said distributing chamber, and means for introducing commingled air and powder under pressure into said distributing chamber.

9. In an apparatus of the class described, a distributing chamber having a substantially convolute wall, an annular passage in communication with said distributing chamber, means for introducing commingled air and powder under pressure into said distributing chamber, and an air conduit within the annular passage.

10. In an apparatus of the class described, a distributing chamber having a substantially convolute wall, an annular passage in communication with said distributing chamber, means for introducing commingled air and powder under pressure into said distributing chamber, an air conduit within the annular passage, and an air chamber surrounding the annular passage.

11. In an apparatus of the class described, three substantially concentric drums and a distributing chamber in communication with the annular space between two of said drums.

12. In an apparatus of the class described, a pair of substantially concentric drums, and a substantially circular tapered distributing chamber in communication with the space between the drums, and means for introducing powder into the distributing chamber adjacent its largest cross section.

In witness whereof I have hereunto set my hand this 17th day of November 1920.

OLIVER EDWARD MERRELL.

Witnesses:
H. E. Chase,
E. M. Fradenburgh.